United States Patent
Perkins et al.

(10) Patent No.: US 6,359,637 B1
(45) Date of Patent: Mar. 19, 2002

(54) DRILL-DOWN APPARATUS FOR DISPLAY OF TREE-BASED HIERARCHIES AND METHOD THEREFOR

(75) Inventors: Alan Curtis Perkins; Paul Brian Young, both of Indianapolis, IN (US)

(73) Assignee: International Busines Machines Corp., Armonk, NY (US)

( * ) Notice: Subject to any disclaimer, the term of this patent is extended or adjusted under 35 U.S.C. 154(b) by 0 days.

(21) Appl. No.: 09/246,021

(22) Filed: Feb. 5, 1999

(51) Int. Cl.$^7$ ................................................. G06F 3/00
(52) U.S. Cl. ..................... 345/853; 345/968; 345/835; 707/101
(58) Field of Search ................................ 345/356, 357, 345/353, 968, 853, 835, 854, 841; 707/3, 5, 101

(56) References Cited

U.S. PATENT DOCUMENTS 5,983,248 A * 11/1999 DeRose et al. ............. 707/907
6,085,188 A * 7/2000 Bachmann ..................... 707/3
6,144,962 A * 11/2000 Weinberg et al. ............ 707/10
6,177,936 B1 * 1/2001 Cragun ....................... 345/340
6,185,550 B1 * 2/2001 Snow et al. ................... 707/1

* cited by examiner

*Primary Examiner*—John Cabeca
*Assistant Examiner*—Kieu D. Vu
(74) *Attorney, Agent, or Firm*—Barry S. Newberger; Winstead Sechrest & Minick P.C.; Jeffrey S. LaBaw

(57) ABSTRACT

A method and apparatus for "drilling down" through a tree-based hierarchy are provided. Node descriptors corresponding to the nodes in the tree-based hierarchy are contained in entries in a data structure. Each node has a descriptor included in a first field in at least one entry in the data structure. A second field of the corresponding entry contains a node descriptor of a descendant node of the node corresponding to the descriptor in the first field. In response to user input, a descendant tree for a selected node is displayed by recursively searching in the first field of each entry in the data structure. Similarly, an ascendant tree is displayed by recursively searching in the second field of each entry in the data structure.

24 Claims, 6 Drawing Sheets

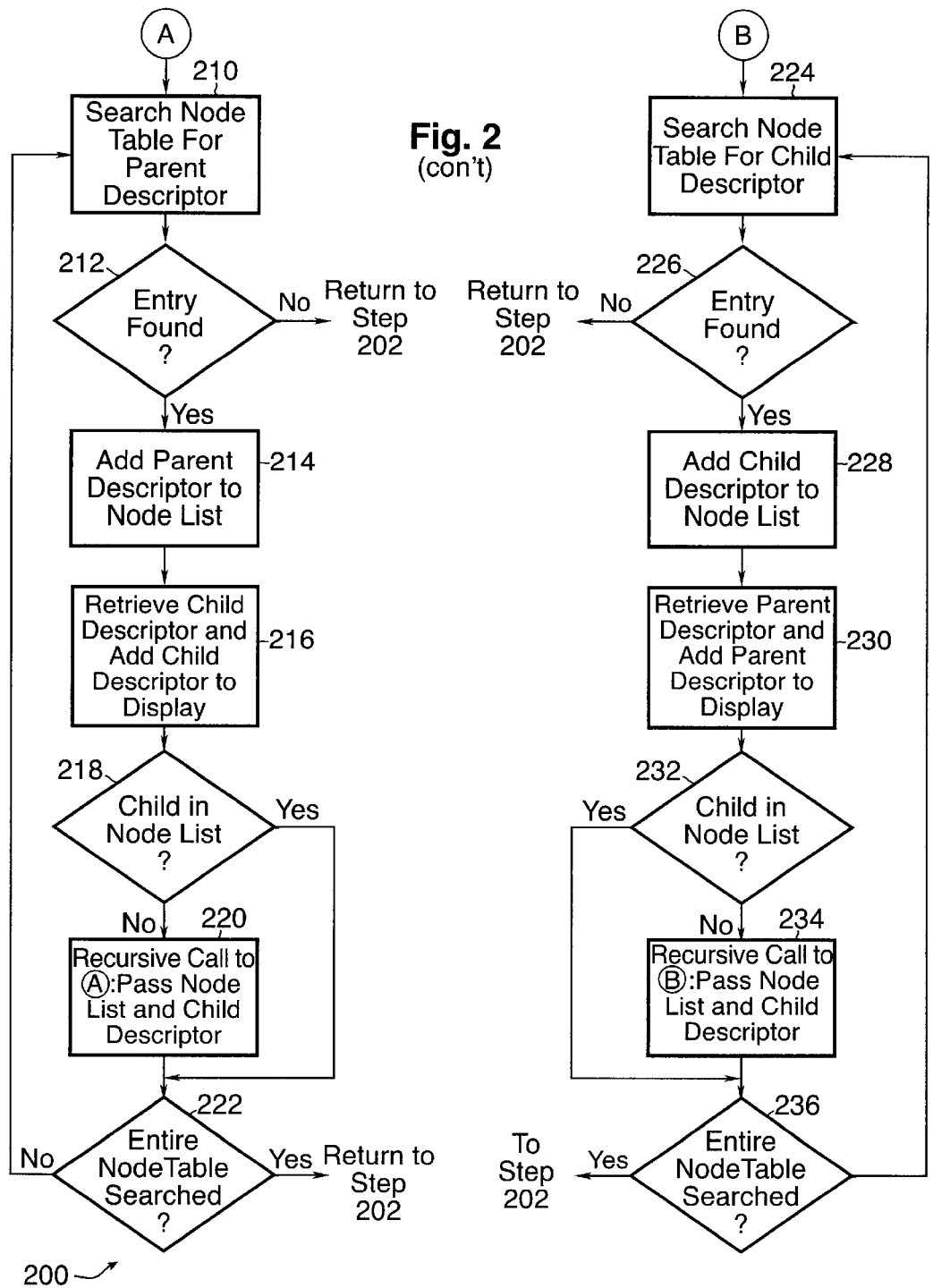
Fig. 2 (con't)

|     | 404       | 406      |
| --- | --------- | -------- |
| 402 | Parent_ID | Child_ID |
|     |           |          |
|     | ⋮         | ⋮        |
|     |           |          |

DRILL-DOWN APPARATUS FOR DISPLAY OF TREE-BASED HIERARCHIES AND METHOD THEREFOR

CROSS-REFERENCED TO RELATED APPLICATIONS

The present invention is related to the following U.S. patent applications:

Ser. No. 09/232,621, entitled "Apparatus for Cross-Referencing Routines and Method Therefor"; and Ser. No. 09/232,622, entitled "Tree-Based Interface Apparatus for Display of Call Dependencies and Method Therefor", which are hereby incorporated herein by reference.

TECHNICAL FIELD

The present invention relates in general to data processing systems, and in particular, to the display of tree-based hierarchies.

BACKGROUND INFORMATION

Data in data processing systems is often organized in a tree-based hierarchy. Such hierarchies are typically composed of multiple relationships wherein a particular node has a "parent-child" relationship to one or more other nodes.

In data processing systems having a graphical user interface (GUI), tree-based hierarchies may be easily displayed and understood. Typically, a high level node (which may be referred to as a "parent node") is first displayed. An icon indicating that the particular parent node has descendants may be associated with the node descriptor of the parent. This icon may be used to effect the display of the dependent nodes (which may be referred to as "child" nodes) of the selected node. Often, a "+" symbol is used as the icon. By selecting the icon, for example, by mouse-clicking on the icon, the GUI is caused to extract and display the dependent nodes of the selected node. An example, in the context of displaying call dependencies in software programs, may be found in the co-pending, commonly-assigned U.S. Patent Applicant entitled "Tree-Based Interface Apparatus for Display of Call Dependencies and Method Therefor," incorporated herein by reference. If one or more dependent nodes themselves have an icon indicating that child has at least one descendant, those descendants may be displayed in a similar fashion. In this way a user can select descendant nodes, until a node is reached that has no dependent nodes. This process is known in the art as "drilling down" through the hierarchy.

It is not uncommon in a particular data processing application in which the data is organized using a tree-based hierarchy for the number of nodes to become large. The number of nodes may, in many instances, reach into the hundreds. Drilling down through all of these nodes by, for example, clicking on an icon associated with the node, as discussed hereinabove, can become a tedious and time-consuming process. Thus, there is a need in the art for an apparatus and method for automatically expanding all dependent nodes to their fullest extent without the need for user actions, such as multiple mouse clicks.

SUMMARY OF THE INVENTION

The aforementioned needs are addressed by the present invention. Accordingly, there is provided, in a first form, a method of displaying tree-based hierarchies. The method includes the step of searching a first field in each entry in a data structure in response to a selection of a first node descriptor and displaying a second node descriptor in a second field of a first entry in response to the first node descriptor in the first field of the first entry. The first field in each entry is searched in response to the second node descriptor.

There is also provided, in a second form, a data processing system. The system includes circuitry operable for searching a first field in each entry in a data structure in response to a selection of a first node descriptor. The system also contains circuitry operable for displaying a second node descriptor in a second field of a first entry in response to the first node descriptor in the first field of the first entry, and circuitry operable for searching the first field in each entry in response to the second node descriptor.

Additionally, there is provided, in a third form, a computer program product operable for storage on program storage media, the program product operable for displaying tree-based hierarchies. The program product contains programming for searching a first field in each entry in a data structure in response to a selection of a first node descriptor, programming for displaying a second node descriptor in a second field of a first entry in response to the first node descriptor in the first field of the first entry, and programming for searching the first field in each entry in response to the second node descriptor.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction the accompanying drawings, in which:

FIG. 4 schematically illustrates a node list data structure in accordance with an embodiment of the present invention.

DETAILED DESCRIPTION

Figure 1:
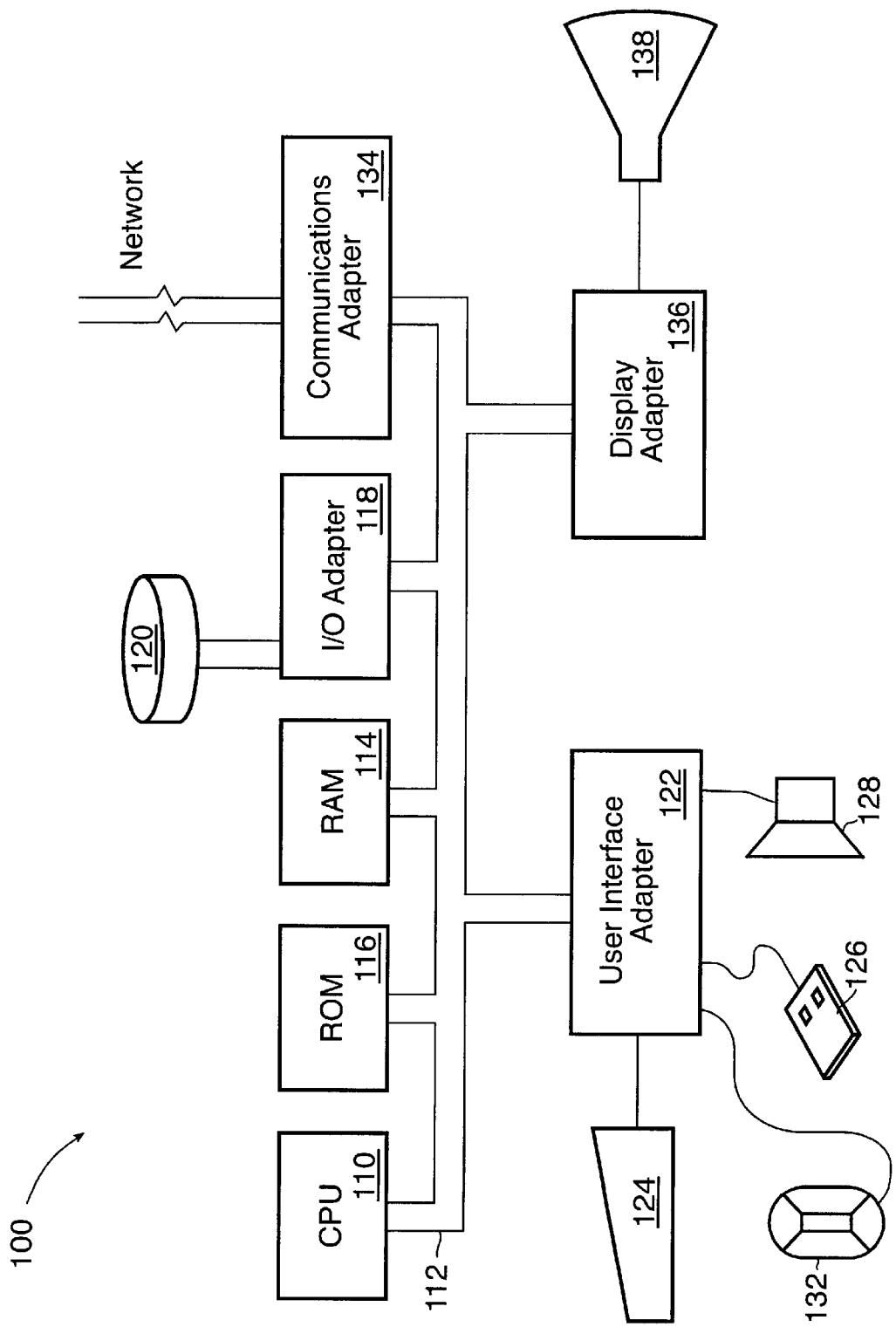
FIG. 1 illustrates, in block diagram form, a data processing system in accordance with one embodiment of the present invention.

The present invention provides a mechanism for automatically drilling down, or "exploding" tree-based hierarchies. A data structure containing identifiers, or descriptors, associated with each member of the hierarchy is accessed. The data structure associates related members which may be referred to as having a parent-child relationship. In response to user input, the methodology of the present invention sweeps through the data structure in recursive fashion, until a last entry in the data structure has been encountered. For each entry in the data structure, the descriptor contained therein is retrieved from the data structure and provided to a display device. The methodology terminates after all entries in the data structure have been looped over.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the figures wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/0 adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
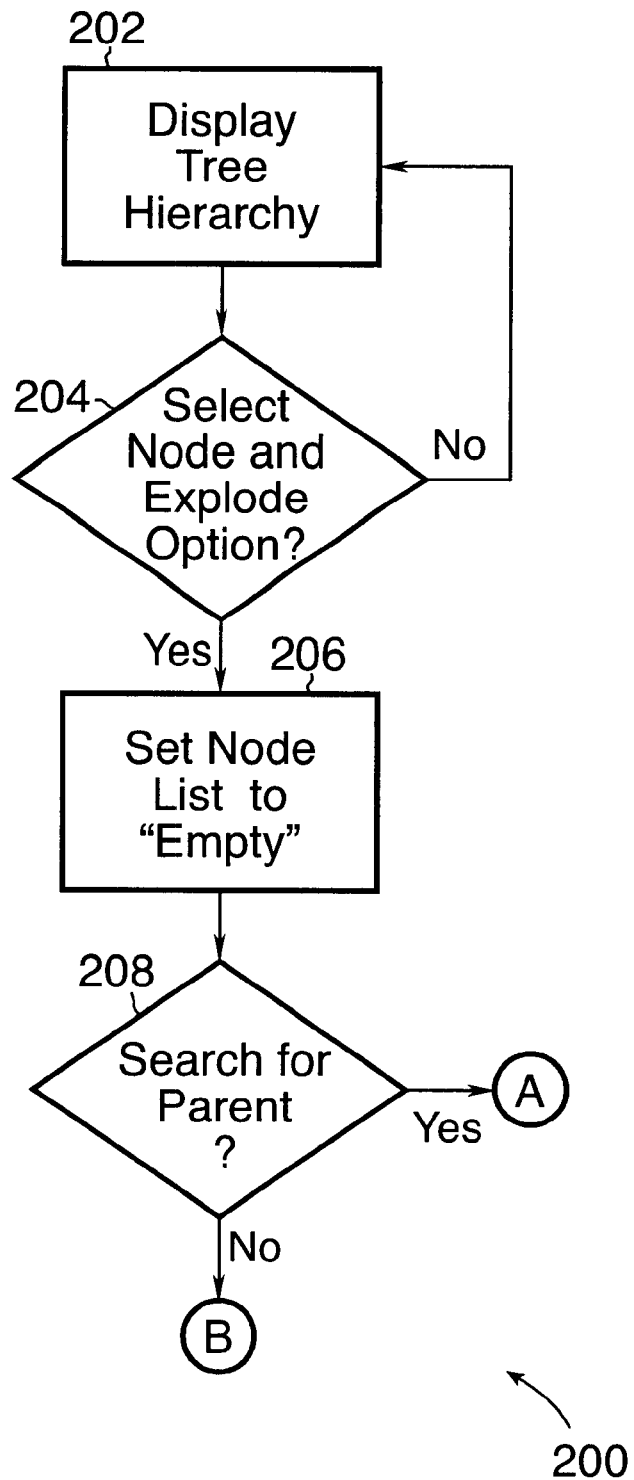
FIG. 2 illustrates, in flow chart form, a drill-down methodology in accordance with the present invention.

Refer now to FIG. 2 in which is illustrated drill down methodology 200 in accordance with the present invention. Although referred to as a drill down methodology for simplicity, as will be further described, methodology 200 may also In step 202, a tree-based hierarchy is displayed. In step 204, it is determined if a node and an "explode" option have been selected in response to user input. The explode option signals data processing system 100 in FIG. 1, according to the present invention, that all parent-child relationships in the tree-based hierarchy are to be displayed. If no selection has been made, methodology 200 loops, returning to step 202. Otherwise, methodology 200 proceeds to drill down through the hierarchy.

Figure 3:
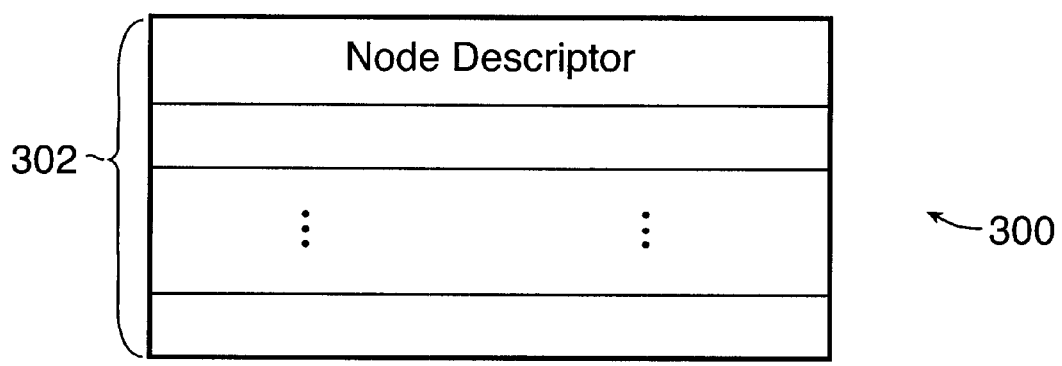
FIG. 3 schematically illustrates a node list in accordance with an embodiment of the present invention.

In step 206, a node list is set to "empty." A node list is a data structure, such as an array, that will be used by methodology 200 to contain node descriptors. An exemplary node list 300 is illustrated in FIG. 3. Node list 300 includes a plurality of entries, or records 302, each operable for containing a node descriptor. In the embodiment of the present invention, elements may be added to the node list dynamically, during the operation of methodology 200. For example, dynamically adding elements to a list would be understood by an artisan of ordinary skill in the art of programming in the C high-level programming language. Initially a node list, such as node list 300, may be empty, including no node descriptors.

Methodology 200 then determines if the tree hierarchy is to display the children, or descendants, of the selected node, in step 208. If so, then in step 208, the "Yes" branch is followed. Otherwise, it is determined in step 208 that the parents, or ancestors, of the node selected in step 204 are to be displayed, and the "No" branch in step 208 is followed. If the "No" branch is followed, methodology 200 may be more precisely said to be "drilling up" through the hierarchy. However, for simplicity, "exploding" the hierarchy in either direction, generically, will be referred to as drilling down through the hierarchy. In an embodiment of the present invention, the selection in step 208 may be made by mouse-clicking, or similar action in a display window containing the tree-based hierarchy. One such embodiment is the context of call dependencies in software applications, has been described in the co-pending, commonly-assigned U.S. Patent Application entitled "Tree-Based Interface Apparatus for Display of Call Dependencies," incorporated herein by reference. A hierarchy of this type will be further described in conjunction with FIG. 5, below.

Figure 4:
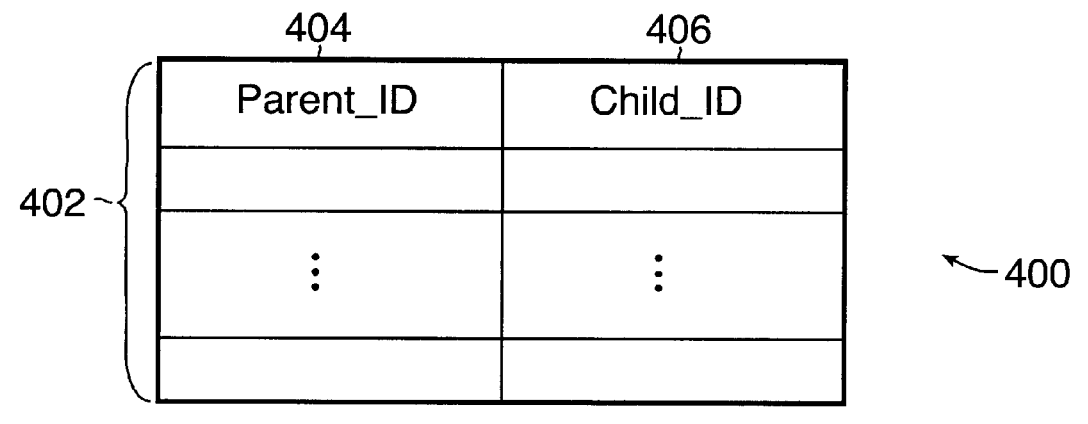

First considering the "Yes" branch in step 208, in step 210, parent fields of a node table are searched for the node descriptor corresponding to the node selected in step 210. A node table is a data structure that is operable for containing node descriptors. An embodiment of a node table 400 which may be used in methodology 200 is illustrated in FIG. 4.

Node table 400 includes a plurality of entries 402. Each entry 402 includes a field 404 operable for storing a node descriptor corresponding to a parent node. A second field, field 406, in each entry 402 is operable for storing a node descriptor representing a child node corresponding to the parent in field 404 of the entry 402. In this way, fields 404 and 406 associate parent and child nodes.

Returning to FIG. 2, in step 210, the contents of field 404 for each entry 402 is searched for a node descriptor corresponding to the node selected in step 204. If an entry 402 is found containing the node descriptor, in step 212, methodology 212 returns to steps 202. If, however, in step 212 an entry is found that contains the node descriptor of the node selected in step 204, then in step 214 the node descriptor is added to the node list, and in step 216 the associated child node descriptor contained in field 406 of the corresponding element 402 is displayed.

In step 218, it is determined if the child node descriptor is contained in the node list. If not, in step 220, steps 210–218 are called recursively. In the recursive call, the node list, as updated in step 214, and the child descriptor displayed in step 216 are passed, wherein the child descriptor now serves as a new parent descriptor for the search of the node table in step 210. In this way, methodology 200 drills down through the hierarchy displaying the descendants of the node selected in step 204. Such recursive processes may be implemented, for example, in the C programming language.

If, however, in step 218, the child node descriptor displayed in step 216 is found in the node list, then the corresponding branch of the tree-based hierarchy has already been mapped, and methodology 218 proceeds to step 222 where it is determined if the entire node table, in field 404, has been searched for the node descriptor corresponding to the node selected in step 204. If, in step 222, it is determined that the entire table has been searched, then methodology 200 returns to step 202. Otherwise, methodology 200 continues searching the node table for the node descriptor corresponding to the node selected in step 204, by returning to step 210.

Returning to step 208, if it has been determined that a search for ancestors has been selected, the "No" branch is followed, and in step 224 the node table, such as node table 400 in FIG. 4 is searched in field 406 for child-descriptor entries corresponding to the node selected in step 204. If no entry 402 is found, then methodology 200 returns to step 202. Otherwise, in step 226 if an entry is found, in step 228 the child descriptor is added to the node list, and in step 230 the associated parent node descriptor is retrieved from field 404 in the corresponding entry 402. The retrieved parent descriptor is added to the display of the tree-based hierarchy.

In step 232, it is determined if the parent node descriptor is contained in the node list. If not, in step 234 a recursive call to steps 224–232 is made, passing the node list updated in step 228 and the parent descriptor retrieved in step 230, wherein the parent descriptor retrieved in step 230 becomes a new child descriptor for the search in the recursively entered step 224. In this way, methodology 200 "drills up" through the hierarchy to display the ancestors of the node selected in step 204.

If, however, in step 232, the parent node retrieved in step 230 is in node list 232, then the ascendant "family" tree of the node selected in step 204 has already been displayed, and methodology 200 continues with step 236, and determines therein if the entire node table has been searched. If so, methodology 200 returns to step 202. Otherwise, the node table is further searched for node descriptors corresponding to the node selected in step 204, by returning to step 224.

In this way, an apparatus and method for drilling down and drilling up through, or exploding, a tree-based hierarchy are provided. By selecting a node descriptor in the display of a tree-based hierarchy, all the descendants, or all the ancestors, of a selected node may be displayed. In an embodiment of the present invention, a child tree may be displayed in a first window, and a parent tree may be displayed in a second window. By selecting a node in the first window, all of the descendants of the selected node may be displayed by the performance of steps 210–222 of methodology 200. Similarly, by selecting a node in the second window, all of the ancestors of the selected node may be displayed, by performing steps 224–236 of methodology 200.

Figure 5:
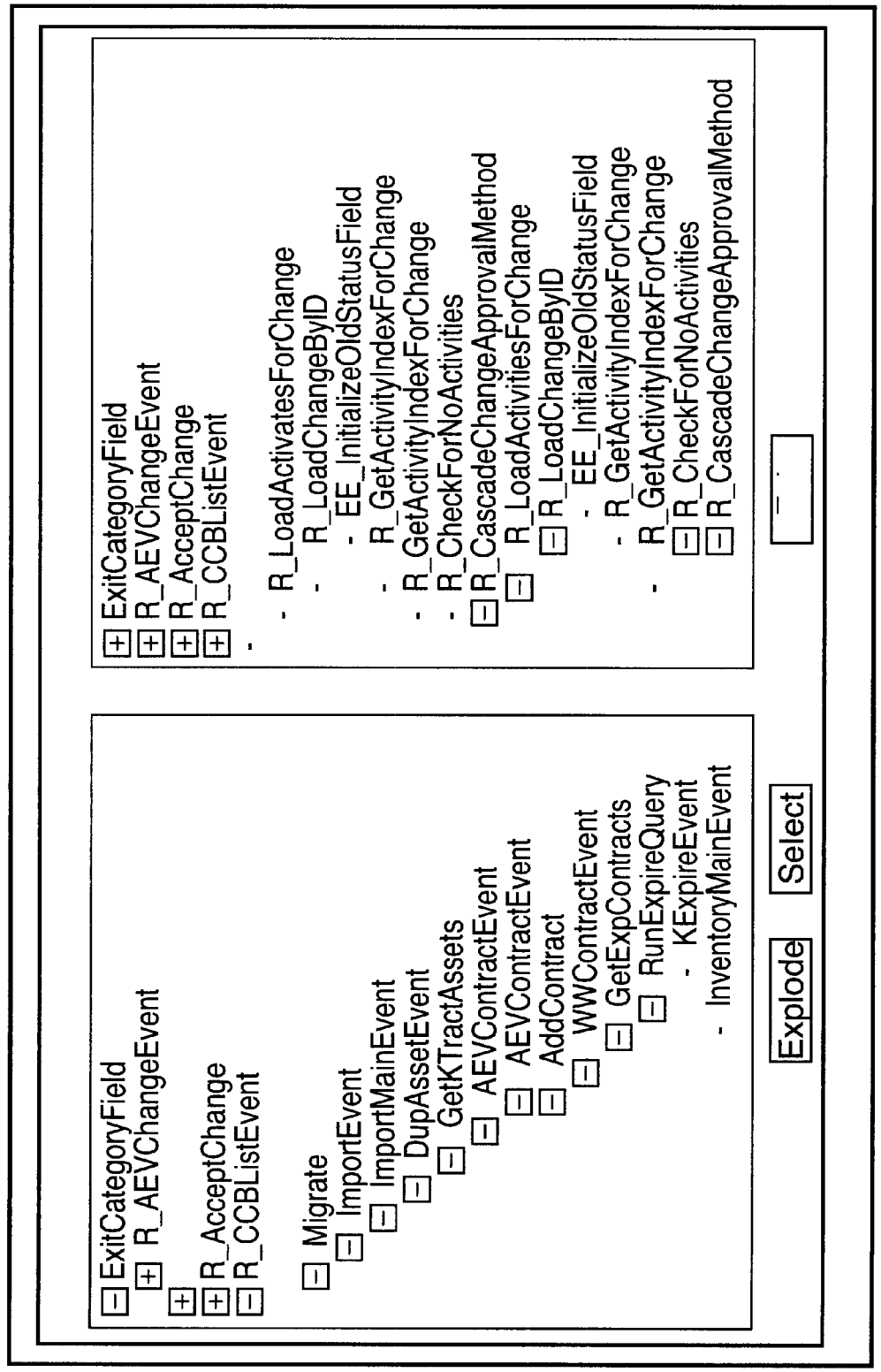
FIG. 5 illustrates a display device in accordance with an embodiment of the present invention.

This may be further understood by considering a tree-based hierarchy for the display of call dependencies in a software application. Such a hierarchy is the subject of the co-pending, commonly-assigned U.S. Patent Application entitled "Tree-Based Interface Apparatus for Display of Call Dependencies and Method Therefor," incorporated herein by reference. In such a hierarchy, a list of routines in the software program may be displayed in each of two windows. The first window, corresponding to the display window for displaying child nodes, displays routines which are called by the selected routine. Thus, these "called-by" routines are the "child" nodes descending from the calling routine. Thus, in accordance with the methodology of the present invention, all routines which are in the calling sequence of the selected routine are displayed. In other words, all of the routines called by the selected routine as well as each routine which are further called by one or more of the routines called by the selected routine are simultaneously displayed, without having to "manually" drill down through the hierarchy. Similarly, in a second window, all of the routines which call the selected routine, that is the "parents" are displayed, along with any routines which call the "parent" routines of the selected routine. In this way, all ancestral calling sequences of the selected routine are displayed. Because a selected routine may be called by more than one calling routine, the selected routine may have a plurality of "parents." An exemplary tree-based hierarchy display illustrating descendant and ascendant calling sequences, in "calls" and "called-by" windows respectively, is illustrated in FIG. 5.

Window 502 is displayed, on display device 138. Window 502 includes call window 504 and called-by window 508. By selecting a routine descriptor, such as the descriptor "R_AEV ChangeEvent" (shown highlighted in window 504), and selecting explode "button" 506, corresponding to step 204 of methodology 200, all of the routines called by R_AEV ChangeEvent and the routines further called by the routines called by the selected routine may be displayed in window 504. By selecting a descriptor in window 504, methodology 200 follows the "Yes" branch in step 208.

Likewise, by selecting a routine descriptor in called-by window 508, and selecting explode button 506, all of the routines which call the selected routine may be displayed in window 508. By selecting routine descriptors in window 508, methodology 200, in step 208 follows the "No" branch. As discussed hereinabove, a selected routine may have a plurality of "parents." For example, R_CascadeChangeApprovalMethod (shown highlighted in window 508) has four "parents," which call it. Similarly, in the generic tree-based hierarchy, a selected node may have a plurality of "parents," which lead to the selected node.

Although the present invention and its advantages have been described in detail, it should be understood that various changes, substitutions and alterations can be made herein without departing from the spirit and scope of the invention as defined by the appended claims.

What is claimed is:

1. A method of displaying tree-based hierarchies comprising the steps of:

searching a first field in each entry in a data structure in response to a selection of a first node descriptor;

displaying a second node descriptor in a second field of a first entry in response to said first node descriptor in said first field of said first entry; and searching said first field in each entry in response to said second node descriptor.

2. The method of claim 1 further comprising the step of displaying a third node descriptor in said second field of a second entry in response to said second node descriptor in said first field of said second entry.

3. The method of claim 1 further comprising the step of recursively searching said first field of each entry for a subsequent node descriptor in response to a previous node descriptor in said first field of an entry, wherein said subsequent node descriptor is in said second field of said entry.

4. The method of claim 3 further comprising the step of displaying said subsequent node descriptor.

5. The method of claim 1 wherein said first field comprises a "parent" field and said second field comprises a "child" field.

6. The method of claim 1 wherein said first field comprises a "child" field and said second field comprises a "parent" field.

7. The method of claim 3 further comprising the steps of:

searching a node list for said subsequent node descriptor; and bypassing said step of recursively searching said first entry in response to said subsequent node descriptor in said node list.

8. The method of claim 7 further comprising the step of adding said previous node descriptor to said node list.

9. A data processing system comprising:

circuitry operable for searching a first field in each entry in a data structure in response to a selection of a first node descriptor;

circuitry operable for displaying a second node descriptor in a second field of a first entry in response to said first node descriptor in said first field of said first entry; and circuitry operable for searching said first field in each entry in response to said second node descriptor.

10. The data processing system of claim 9 further comprising circuitry operable for displaying a third node descriptor in said second field of a second entry in response to said second node descriptor in said first field of said second entry.

11. The data processing system of claim 9 further comprising circuitry operable for recursively searching said first field of each entry for a subsequent node descriptor in response to a previous node descriptor in said first field of an entry, wherein said subsequent node descriptor is in said second field of said entry.

12. The data processing system of claim 11 further comprising circuitry operable for displaying said subsequent node descriptor.

13. The data processing system of claim 9 wherein said first field comprises a "parent" field and said second field comprises a "child" field.

14. The data processing system of claim 9 wherein said first field comprises a "child" field and said second field comprises a "parent" field.

15. The data processing system of claim 11 further comprising:

circuitry operable for searching a node list for said subsequent node descriptor; and circuitry operable for bypassing said step of recursively searching said first entry in response to said subsequent node descriptor in said node list.

16. The data processing system of claim 15 further comprising circuitry operable for adding said previous node descriptor to said node list.

17. A computer program product embodied in a machine readable program storage medium, the program product operable for displaying tree-based hierarchies, comprising:

programming for searching a first field in each entry in a data structure in response to a selection of a first node descriptor;

programming for displaying a second node descriptor in a second field of a first entry in response to said first node descriptor in said first field of said first entry; and programming for searching said first field in each entry in response to said second node descriptor.

18. The program product of claim 17 further comprising programming for displaying a third node descriptor in said second field of a second entry in response to said second node descriptor in said first field of said second entry.

19. The program product of claim 17 further comprising programming for recursively searching said first field of each entry for a subsequent node descriptor in response to a previous node descriptor in said first field of an entry, wherein said subsequent node descriptor is in said second field of said entry.

20. The program product of claim 19 further comprising programming for displaying said subsequent node descriptor.

21. The program product of claim 17 wherein said first field comprises a "parent" field and said second field comprises a "child" field.

22. The program product of claim 17 wherein said first field comprises a "child" field and said second field comprises a "parent" field.

23. The program product of claim 19 further comprising:

programming for searching a node list for said subsequent node descriptor; and programming for bypassing said step of recursively searching said first entry in response to said subsequent node descriptor in said node list.

24. The program product of claim 23 further comprising programming for adding said previous node descriptor to said node list.

* * * * *

UNITED STATES PATENT AND TRADEMARK OFFICE
CERTIFICATE OF CORRECTION

PATENT NO. : 6,359,637 B1  Page 1 of 1
DATED : March 19, 2002
INVENTOR(S) : Alan Curtis Perkins and Paul Brian Young It is certified that error appears in the above-identified patent and that said Letters Patent is hereby corrected as shown below:

<u>Title page,</u>
Item [73], please replace "Busines" with -- Business --.

Signed and Sealed this

Twenty-fifth Day of June, 2002

Attest:

JAMES E. ROGAN
Attesting Officer  Director of the United States Patent and Trademark Office